United States Patent [19]

Hines, Sr.

[11] Patent Number: 5,437,335

[45] Date of Patent: Aug. 1, 1995

[54] MEANS FOR BACKFILLING MULTIPLE AERATION HOLES

[76] Inventor: Albert K. Hines, Sr., Rte. 2, Box 135, Enfield, N.C. 27827

[21] Appl. No.: 63,765

[22] Filed: May 20, 1993

[51] Int. Cl.6 .......................... A01C 15/00; A01B 45/02
[52] U.S. Cl. ...................................... 172/22; 111/170; 111/200; 222/450
[58] Field of Search ................... 172/21, 22; 111/7.1, 111/7.2, 170, 95, 200; 222/214, 450

[56] References Cited

U.S. PATENT DOCUMENTS

| | | | |
|---|---|---|---|
| 2,718,856 | 9/1955 | Gatherwal | 111/7.1 |
| 4,122,784 | 10/1978 | Joswig | 111/901 |
| 4,155,315 | 5/1979 | Dobbins | 172/21 |
| 4,476,938 | 10/1984 | McKay | 172/22 |
| 4,529,106 | 7/1985 | Broadfoot et al. | 222/214 |
| 5,035,350 | 7/1991 | Blette et al. | 222/214 |
| 5,215,215 | 6/1993 | Sauer | 222/214 |

Primary Examiner—David H. Corbin
Assistant Examiner—Spencer Warnick
Attorney, Agent, or Firm—John G. Mills & Associates

[57] ABSTRACT

This invention is a soil backfilling device mounted on a vehicle used for producing a plurality of aeration holes in a single operation. A control is provided for metering the backfill media into a plurality of metering tubes and a second control is used for selectively disbursing the backfill from the metering tubes into the aeration holes. The backfilling device is shown in conjunction with one type of multiple aeration hole forming machine but, of course, it could be used in conjunction with other machines accomplishing the same results.

4 Claims, 9 Drawing Sheets

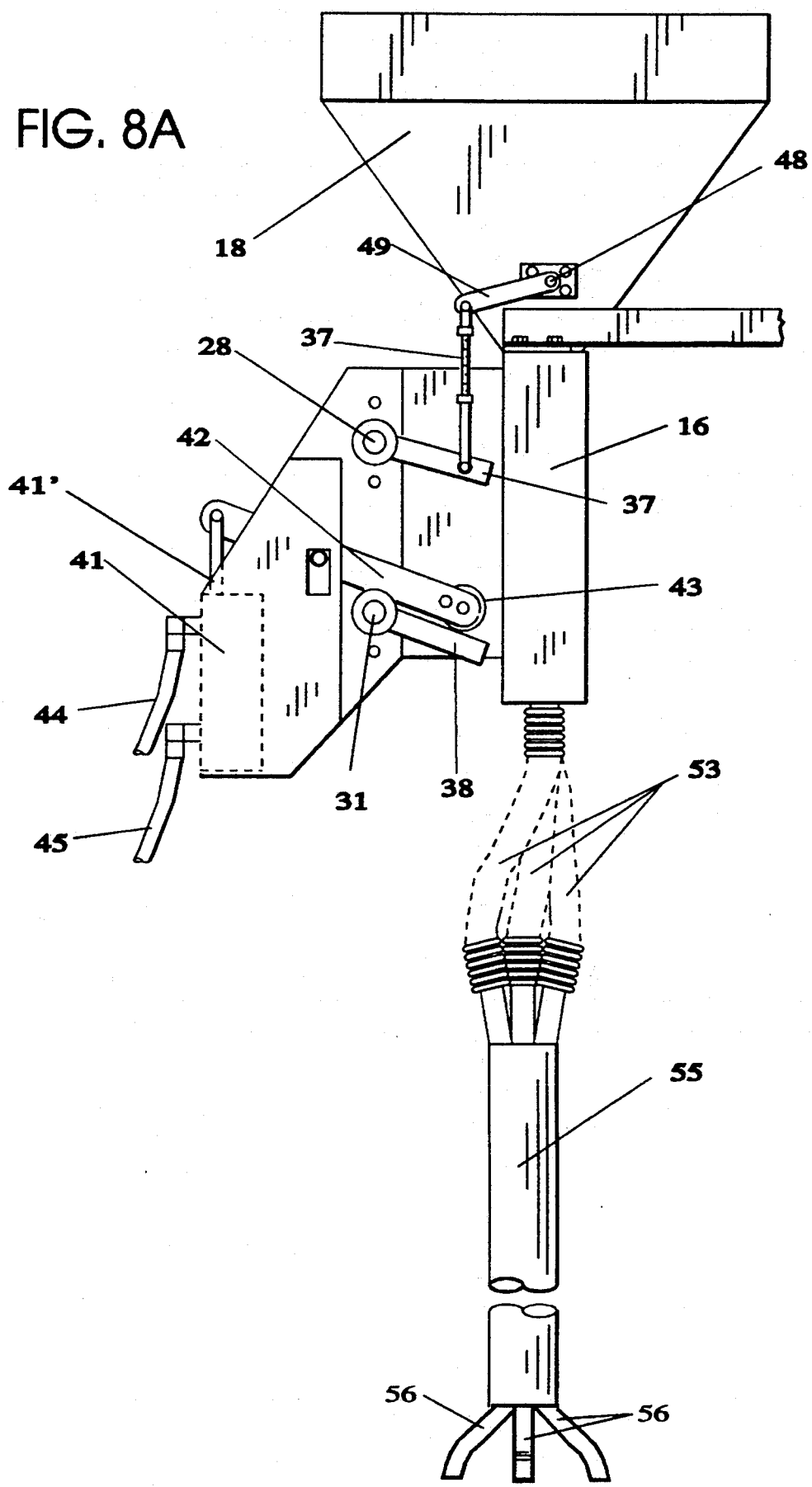

MEANS FOR BACKFILLING MULTIPLE AERATION HOLES

FIELD OF INVENTION

This invention relates to agricultural devices and more particularly to means for backfilling multiple aeration holes in turf and similar applications.

BACKGROUND OF INVENTION

Man has long known that aeration is necessary to replenish the soil and promote continued growth of plants. Cropland and gardens achieve this aeration by tilling and replanting operations. But in areas such as lawns, golf course greens, athletic fields and cemeteries, these historic methods of aeration are not possible. The detrimental wear and compaction caused by foot traffic and motorized vehicle operation make aeration even more necessary.

Scientists consider 50% mineral matter, 25% air and 25% water, by volume, to be the ideal growth medium for turf grass. The soil should have large pores, called macropores, to ensure air circulation and quick drainage. Equally important are the smaller pores, called micropores, that hold moisture against gravity and make it available for plant roots. The number of macropores and micropores should be approximately equal.

The compression of soil from continuous traffic will destroy the macropores and create micropores thus destroying the balance of the pores with a resulting lack of oxygen and poor drainage which will force root structures to alter their growth pattern. The tight soil resists root penetration and growth causing the root system to grow close to the surface. This shallow root system is more susceptible to environmental damage, poor growth and poor stress recovery in turf grass.

Traditionally, man has tried to combat this type of soil compaction with aerators that drive short spikes on rollers into the soil. This type aeration produces a ripping or tearing effect in the root system as well as creating a compaction layer, called hardpan, below the reach of the spikes.

In order to break through the hardpan without compromising the existing root structure, scientists now recommend aeration penetration of the soil from 8 to 12 inches in depth. Studies have documented increased air flow, drainage and deeper root growth in areas using this deeper penetration aeration method which restores the macropore/micropore balance.

The Deep Drill Aerofier, manufactured by the Flody and McKay Aerofier Co., Inc. of Dunn, North Carolina which is shown and described in U.S. Pat. No. 4,476,938 issued on Oct. 16, 1984 to Leon A. McKay, was designed for this type of aeration. It is a self-propelled unit with a drill head attachment. The drill head has multiple drill bits turning in unison while being lowered into the ground. This allows for deep aerofication penetration of up to ten inches without the accompanying root damage caused by spike aerators as mentioned above. As the drill bits are removed from the ground, loose soil is pulled up and deposited on the surface in an "ant hill" type mound. This mound is scattered over the ground surface and is quickly integrated into the surrounding turf.

To complete the aerofication process, scientists now suggest top-dressing the surface with a sand-based medium. This is currently being accomplished by dumping the top-dressing medium on the soil surface and spreading it to the aerated holes with gardening tools and brooms. This process is extremely time consuming and labor intensive. Since this process involves trying to sweep or push the top-dressing medium across a turf grass surface, there is a bruising effect on the surface grass and a large amount of dressing material is lost in the process.

CONCISE EXPLANATION OF REFERENCES

U.S. Pat. No. 4,133,274 to Orth et al discloses a method of regenerating lawn surfaces which includes a motor driven chassis which periodically stops and drills holes in the turf and subsequently fills each hole with a special pre-formed plug. This system is manually operated by an operator walking behind the same, does not aerate and backfill large areas at the time, and certainly does not use the same type of dispensing means taught by the present invention. Also there is no suggestion of deep drilling through hardpan.

U.S. Pat. No. 3,109,393 to Dion, which was cited in McKay U.S. Pat. No. 4,476,938, is considered of interest in that it discloses a lawn aerating and fertilizing machine wherein a hole is drilled in a lawn to aerate the same and fertilizer is then deposited in the hole.

U.S. Pat. No. 2,127,510 to Fulton is considered of interest in that it discloses a means for spiking turf which also indicates that the holes may be filled with sand. Otherwise there is no resemblance to the present invention.

U.S. Pat. No. 4,336,760 to Cohen et al is considered of interest in that discloses an earth working apparatus including aerators and material dispensers which punch holes in the ground and then spreads material similar to a fertilizer spreader.

U.S. Pat. No. 3,394,667 to White and U.S. Pat. No. 3,926,131 to Collins are both considered of general interest in that they disclose devices for making holes in the earth and for depositing soil treating liquids therein.

Finally, U.S. Pat. No. 2,234,778 to Redwood is considered of general interest in that it discloses an opion planter which makes multiple holes in the earth prior to the planting process.

BRIEF DESCRIPTION OF INVENTION

After much research and study into methods of providing a more efficient means of delivering top-dressing material into the holes on an aerated surface, the present invention has been developed to provide a mechanical system, unique to the industry, that, when attached to a modified Floyd-McKay deep drill aerofier, multiple aeration holes can be drilled and the top-dressing or backfill mediums deposited into each of these holes. This greatly reduces the time restraints and unnecessary labor involved in aerofying and backfilling turf grass surfaces. It also eliminates much of the wasted backfilling material by depositing the medium directly into the holes without leaving an appreciable amount of medium on the turf grass surface.

The automated backfill device of the present invention consists of two hoppers for the backfill medium, an adjustable metering device and a flexible tubing system that runs from the hoppers through the drill head. After the standard drilling and soil removal operation, the machine operator simply activates the backfill release lever to deposit pre-measured amounts of backfill medium into the holes. Upon completion of the backfill process, the operator pulls the backfill reload lever, drives the machine to the next desired location and begins the aerofication process over again.

OBJECTS OF INVENTION

In view of the above it is an object of the present invention to provide an improved backfilling system for multiple aeration hole drilling machines.

Another object of the present invention is to provide a means for preventing the collapse of newly created macropore systems of turf stands.

Another object of the present invention is to provide an improved tube and crimping system for pre-measured backfill medium dispensing means.

Another object of the present invention is to provide an automated backfill device having an adjustable metering system for filling a plurality of aeration holes at a single dispensing.

Other objects and advantages will become apparent and obvious from a study of the following description and the accompanying drawings which are merely illustrative of such invention.

BRIEF DESCRIPTION OF DRAWINGS

FIG. 6b is a cutaway view showing the plunger positions when the levers are in the position shown in FIG. 6a.

FIG. 7b is a cutaway view showing the plunger position when the levers are in the position shown in FIG. 7a.

FIG. 8a is a rear elevational view with the fill lever closed and the dump lever open;

FIG. 8b is a cutaway view showing the positions when the levers are in the position shown in FIG. 8a.

DETAILED DESCRIPTION OF INVENTION

With further reference to the drawings, a self propelled support vehicle carrying a means for producing multiple aeration holes in turf or similar surfaces, indicated generally at 84, is shown and described in detail in U.S. Pat. No. 4,476,938 issued to Leon A. McKay on Oct. 16, 1984. Since the manner and mode of operation in drilling multiple aeration holes in golf greens and similar applications is detailly described therein, further detailed discussion of the same is not deemed necessary.

Figure 7A:
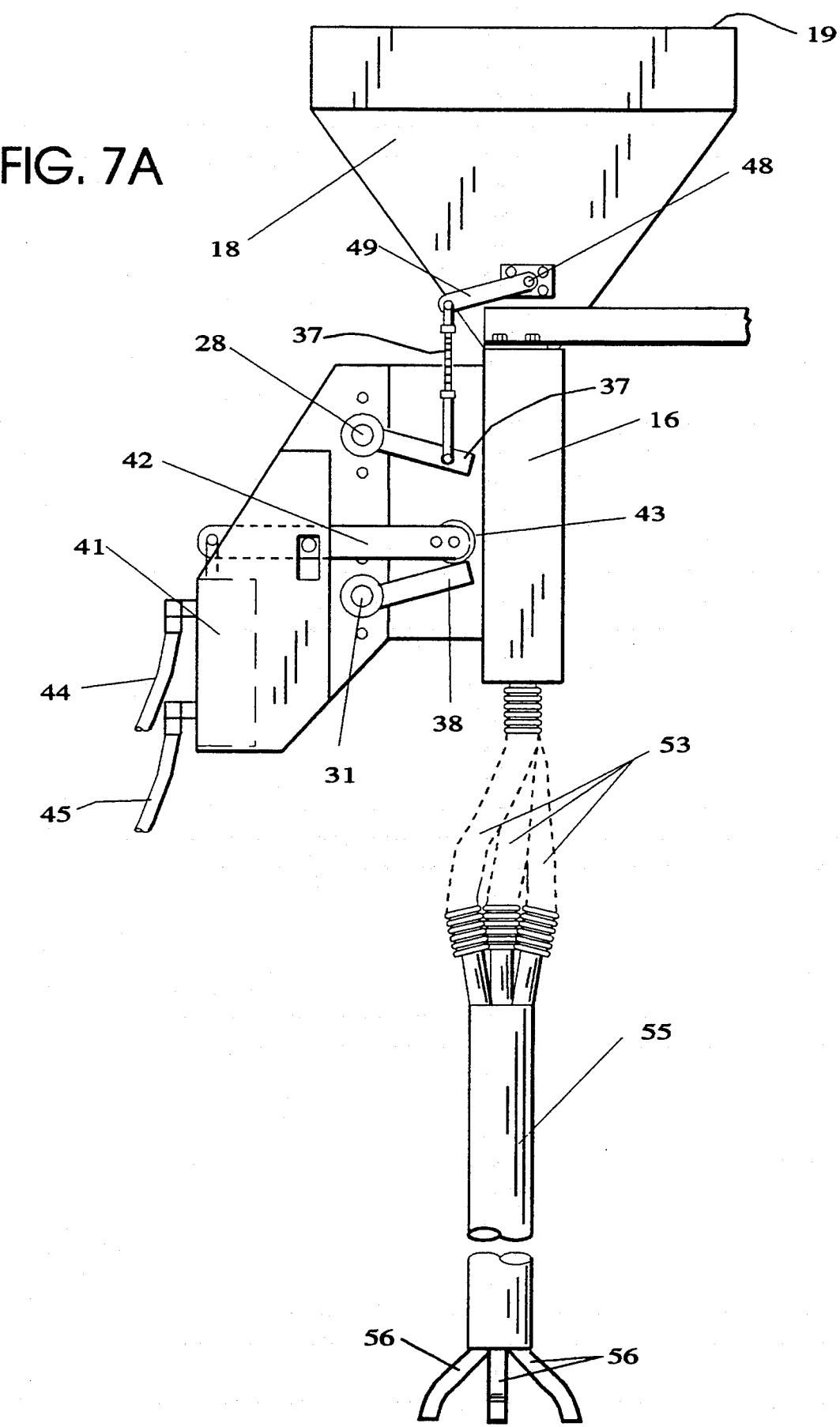
FIG. 7a is a rear elevational view of the fill and dump levers in neutral position with the fill and dump plungers both closed.

Reference numbers 26, 64, and 84 through 110 of the present drawings are the same numbers for the same parts shown in FIG. 7 of the McKay Patent so it can be readily seen how the present invention is mounted and used on a multi-opening, aerating device. It is to be understood, however, that the present invention can also be used in conjunction with other aerating means if so desired.

The means for backfilling multiple aeration holes of the present invention is indicated generally at 10. These means are disposed on opposite sides of the hump portion 85' of hump shaped frame 85 of support vehicle 84. Since these units disposed on opposite sides of the frame are substantially identical in operation, only the one shown on the left side of said vehicle will be described in detail.

A pair of mounting brackets 11 formed from angle iron or other suitable material are adapted to be mounted on the interior upper edge of the presser skirt 90 by bolts or similar means 12.

Figure 4:
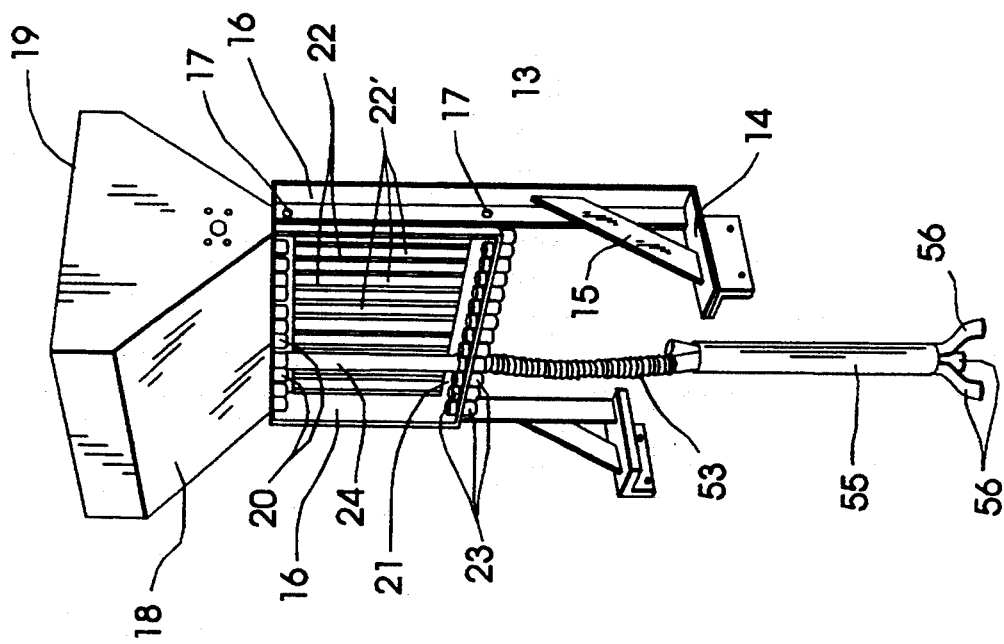
FIG. 4 is a perspective of a portion of the present invention view showing the mounting sleeve for the fill and dump plungers.
Figure 5:
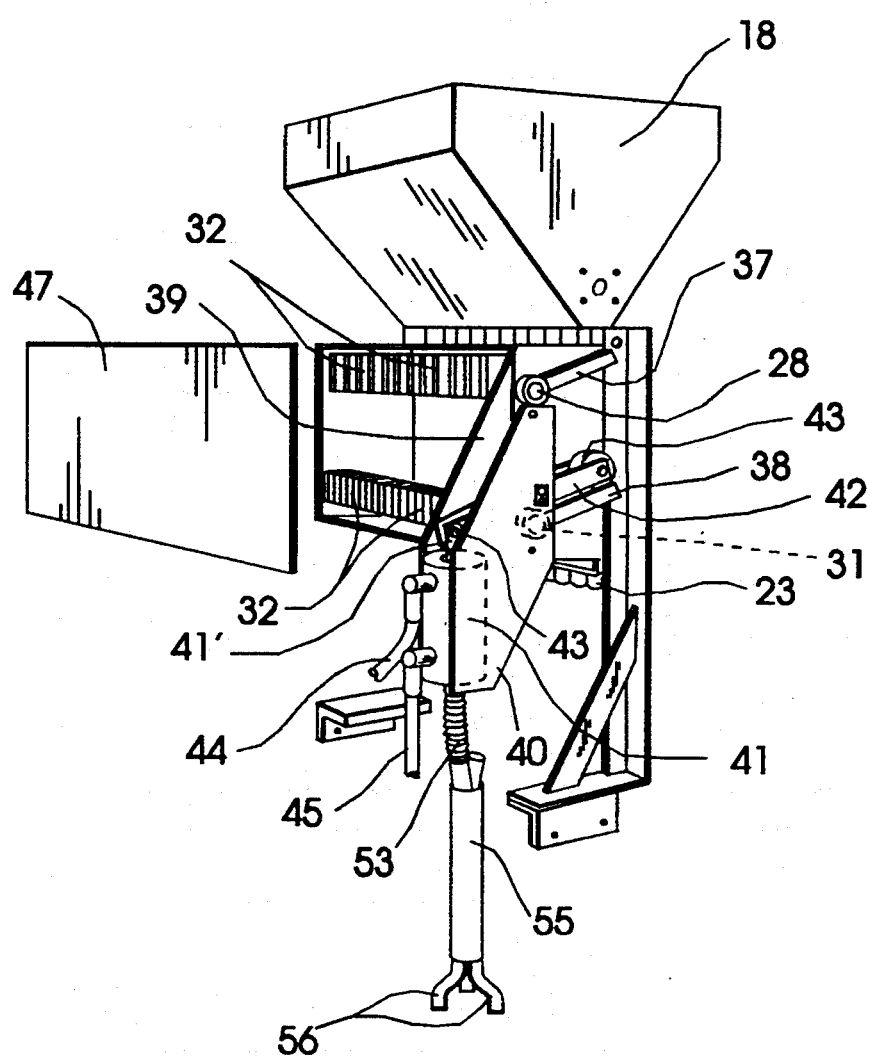
FIG. 5 shows the fill and dump levers with their associated pivot blocks for operating the plungers.

L-shaped support frames 13 include a foot portion 14 which is secured by weldment or other means to mounting brackets 11. Reinforcing braces 15 are also included as can clearly be seen in FIGS. 3 through 5.

A rectangular box frame 16 is secured to the L-shaped support frames 13 by means such as bolts 17. A hopper 18 formed from sheet metal or other suitable material is open at its top 19 and tapers downwardly and inwardly to the point where it is operatively mounted on the top of box frame 16. Since hoppers of this type are well known to those known skilled in the art, further detailed discussion of the same is not deemed necessary.

Extending through the upper edge of box frame 16, and communicating with the interior of hopper 18, are a plurality of downwardly extending hoper tubes 20.

As shown in the drawings, a rear wall 21 encloses the right side of box frame 16 and has munted on the interior thereof a tube backing plate 22 that is scallped in horizontal cross-section and is so sized that measuring tubes 22, when connected to hopper tubes 20, will lie in juxtaposition to each of the semiOcircular troughs of said tube backing plate.

Figure 3:
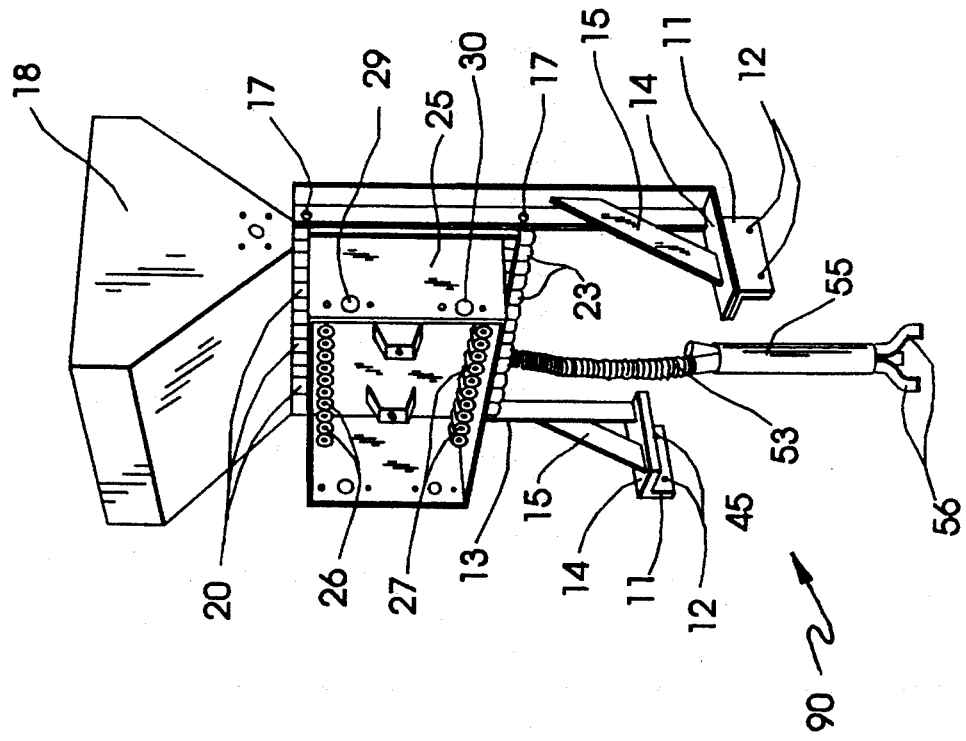
FIG. 3 is perspective view of a portion of the present invention showing one of the fill measuring tubes in place.

A single measuring tube 24 is shown in FIG. 3 connected to one of the plurality of hopper tubes 20 and being disposed in one of the semiOcircular troughs of tube backing plate 22. When in use, a measuring tube 24 will be connected to teach of the hopper tubes 20 and will fill all of the semi-circular troughs 22'.

A plurality of disbursing tubes 23 pass through the lower edte of box frame 15 and are secured thereto. The lower end of each of the hopper tubes 20 is in alignment with one of the disbursing tubes 23. Between each of these axially aligned tubes is operatively connected one of the measuring tubes 24 as clearly illustrated in FIG. 3.

The hopper tubes 20 and measuring tubes 23 are constructed from metal or other suitable material while each of the measuring tubes 24 are formed from a resilient, deformable material having a memory so that the same can be crimped off to stop flow and yet when pressure is released the same will move back to its original shape allowing flow as will hereinafter be described in greater detail.

A disbursing tube control box 25 is mounted on the left side of box frame 16 and includes an upper, top row of plunger tubes 26 and a lower, bottom row of plunger tubes 27 each passing through the right side of wall of box 25. Each of the upper plunger tubes is in vertical alignment with one of the lower plunger tubes. Each of these pairs of aligned plunger tubes are also in vertical alignment with one of the deformable disbursing tubes 23.

An upper plunger control shaft 28 passes through openings 29 on opposite ends of control box 25 and is rotatively mounted therebetween. A second pair of generally horizontally aligned openings 30 are provided through which lower plunger control shaft 31 is rotatively mounted.

A plurality of plunger control blocks 32 are mounted on and are secured to the upper and lower plunger control shafts 28 and 31. Each of the plunger control blocks 32 are in axial alignment with one of the upper or lower plunger tubes 26 or 27.

Each of the plungers 33 have a rounded outer end 34 and are adapted to engage and crimp off associated measuring tubes 24. A plunger shaft 35 of smaller diameter than plunger 33 extends outwardly from the end of each of said plungers. The openings in the right ends of each of the plunger tubes, adjacent the measuring tubes, are sized to slidingly accept plungers 33 while the openings in the left ends of such tubes are so sized to accept the smaller plunger shafts 35.

A coil spring, having an interior diameter slightly greater than the diameter of plunger shaft 35 and an extension diameter no larger than the diameter of plunger 33, is placed in each of the plunger tubes 26 or 27 so that the associated plunger 33 will always be biased to the right toward its associated measuring tube 24.

Whenever pressure is not being placed on plunger shaft 35 pulling it to the left, the rounded end 34 of plunger 33 will press against the associated measuring tube 23 to collapse and crimp or clamp the same off so that no further material can flow therethrough as will hereinafter be described in greater detail.

On the ends of upper and lower plunger control shafts 28 and 31 are fixedly mounted control levers 37 and 38, respectively.

A hydraulic cylinder mounting plate 39 is bolted or otherwise attached to one end of control box 25. A second mounting plate 40 is mounted on plate 39 in spaced relation thereto. Between said plates is mounted a lever activating means such as double acting hydraulic cylinder 41. Also mounted between mounting plates 39 and 40 is plunger motivating arm 42. This arm is pivotally mounted, generally in the center thereof, on shaft 42' so that the same becomes a rocker arm.

The end of control arm 42, adjacent hydraulic cylinder 41, is operatively connected thereto by pin 42''. The opposite end of control arm 42 has a roller 43 mounted thereon. Thus it can be seen that by manipulating hydraulic cylinder 41, the control arm 42 can be used to manipulate the plunger control levers 37 and 38.

Hydraulic lines 44 and 45 are operatively connected to hydraulic cylinder 41 at one end and to control actuator 46 operatively mounted on control panel 110. Since the operation of hydraulic cylinders and their controls are well known to those skilled in the art, further detailed description of the same is not deemed necessary.

A closure 47 for control box 25 is made of sheet metal or other suitable material and can be mounted thereon by screws or other fastening means (not shown).

The outer end of each of the plunger shafts 35 is adapted to receive a pin 57 that mounts a toggle link 58.

A similar pin 59 mounts the other end of the toggle link to the aligned control block 32.

Figure 6A:
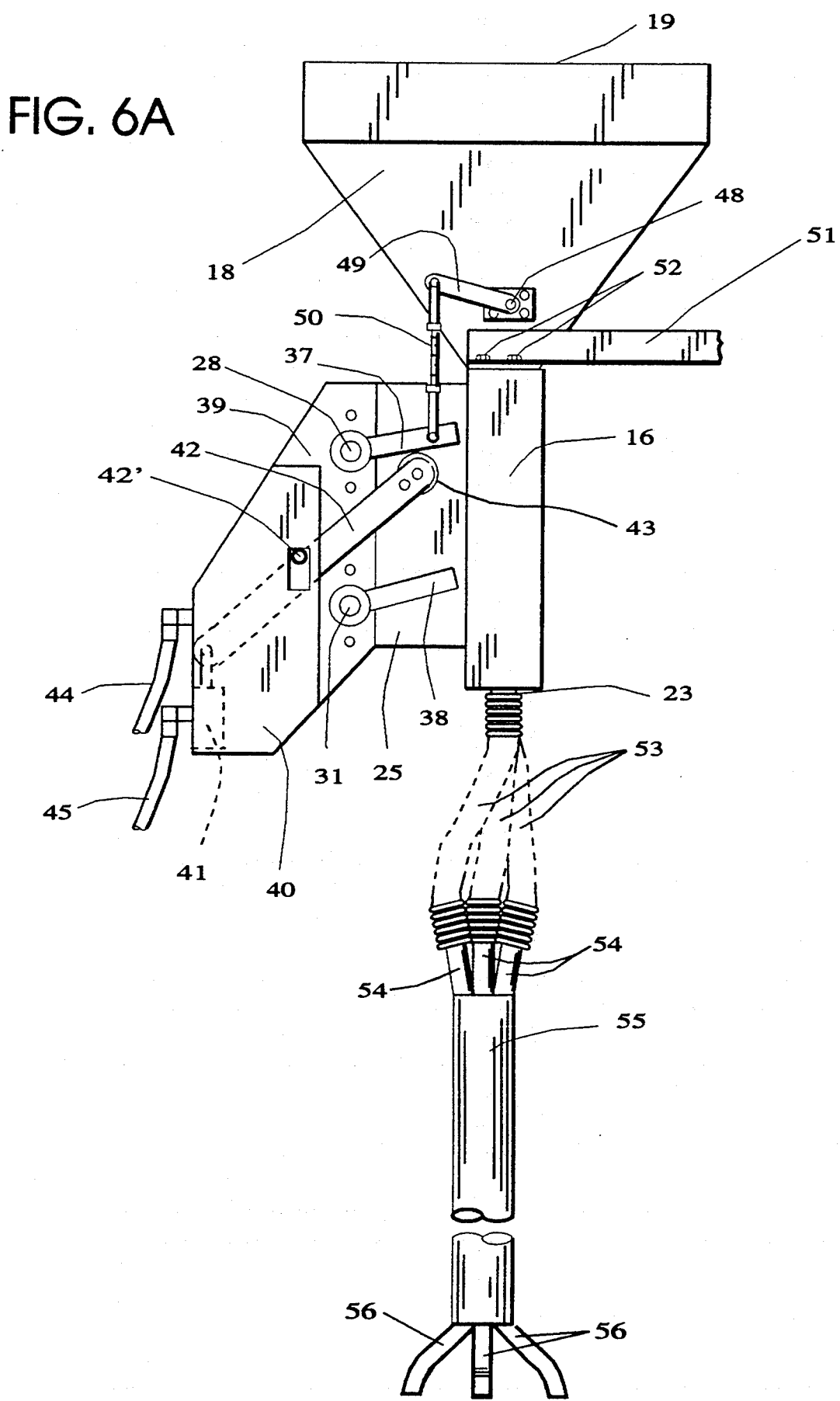
FIG. 6a is a rear elevational view of the backfilling means with the fill lever open and the dump lever closed.
Figure 6B:
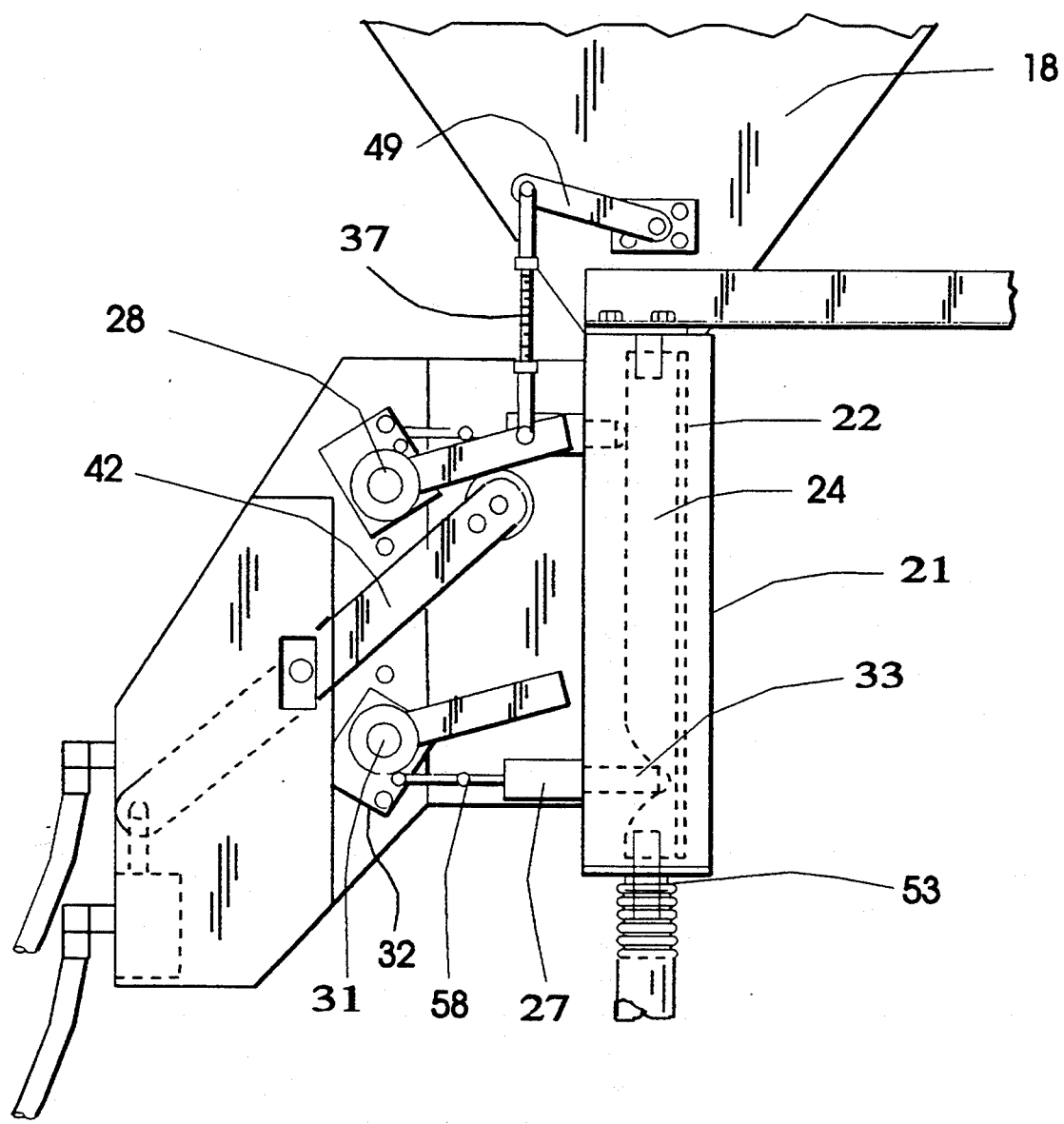

The end of mounting shaft 48 for the internal butterfly valve (not shown) in hopper 18 is fixedly secured to valve activating lever 49. The other end of this lever is connected to the outer end of upper control lever 37 by length adjustable linkage 50 as can clearly be seen in FIGS. 6 through 8.

As indicated above, a pair of backfilling means 10 are provided when mounted on the self propelled support vehicles 84, one on either side of hump portion 85'. An upper support brace 51, formed from angle iron or other suitable material, extends between such backfilling means and are secured by bolts 52 to the top part of the box frame 16, on opposite sides of hopper 18, as can clearly be seen in FIGS. 6 through 8.

Communicatively connected to the bottom of each of the tubes 23 are flexible, bifurcated hoses 53 which are either clear or opaque so that the operator (not shown) of the backfilling means of the present invention can observe when the flow of backfill material is continuing and when it has ceased as will hereinafter be described in greater detail.

Figure 1:
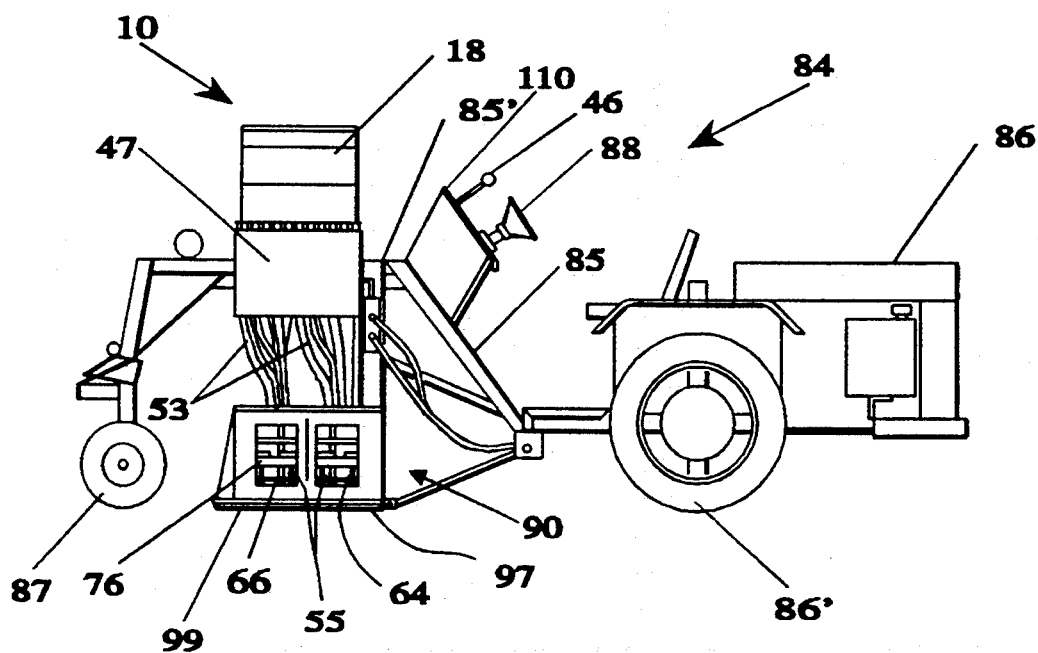
FIG. 1 is a side elevational view of a self propelled support vehicle for drilling multiple aeration holes simultaneously with the means for backfilling multiple aeration holes of the present invention operatively mounted thereon.
Figure 2:
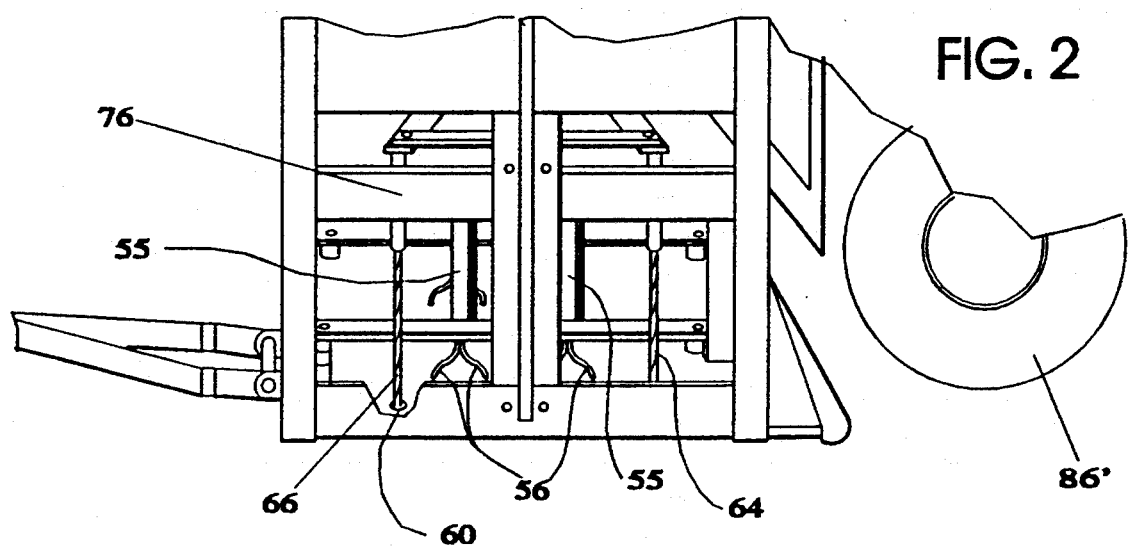
FIG. 2 is a cutaway perspective view of the presser skirt with the drills retracted and the holes being backfilled.

The lower end of each of the flexible hoses 53, opposite tube 23, is communicatively connected to a disbursing tube 54. A plurality of these disbursing tubes are bundled together in disbursing sleeves 55. Extending below the lower end of each of these sleeves 55 are outwardly and downwardly extending disbursing feet 56 which, when properly mounted and disposed within presser skirt 90, each foot will dispense backfill material into one of the aeration holes which has just been formed from an adjacent drill bit 64 as can clearly be seen in the partial cutaway view of FIG. 2.

Once the aeration hole backfilling means of the present invention has been assembled and mounted on a support vehicle 84 carrying aerating gang drills, the same is ready for operation.

To use the backfilling means of the present invention 10, the support vehicle 84 is started and the presser skirt 90 raised clear of the ground as described in the McKay Patent. The vehicle is then driven to the aerating site and stopped. The presser skirt 90 is then lowered to hold the presser pad 99 and its associated presser foot 97 against the ground. The gang drills operatively associated with drill frame 26 are activated and the drill frame lowered with the turning bits coming into contact with the ground to be aerated. The continued downward pressure on the frame is continued until the proper depth of the aeration holes have been reached. The drill frame is then raised to withdraw its associated bits from the ground leaving a plurality of aeration holes therein. The hydraulic activator 46 on control panel 110 is manipulated to cause the hydraulic cylinder 41 to retract which pivots rocker arm 42 to the position shown in FIGS. 6a and 6b. Since there is no pressure on the lower plunger control lever 38, the plunger spring 36 pushes the lower plunger 33 inwardly to crimp off the respective measuring tubes 24. Since rocker arm 42 has raised the upper plunger control lever the associated plungers are pulled back out of contact with the tube 24 while at the same time opening the butterfly valve (not shown) in hopper 18 as clearly illustrated in FIG. 6b. The sand or other backfill medium can flow from the hopper 18 and fill the disbursing tube 24.

Figure 7B:
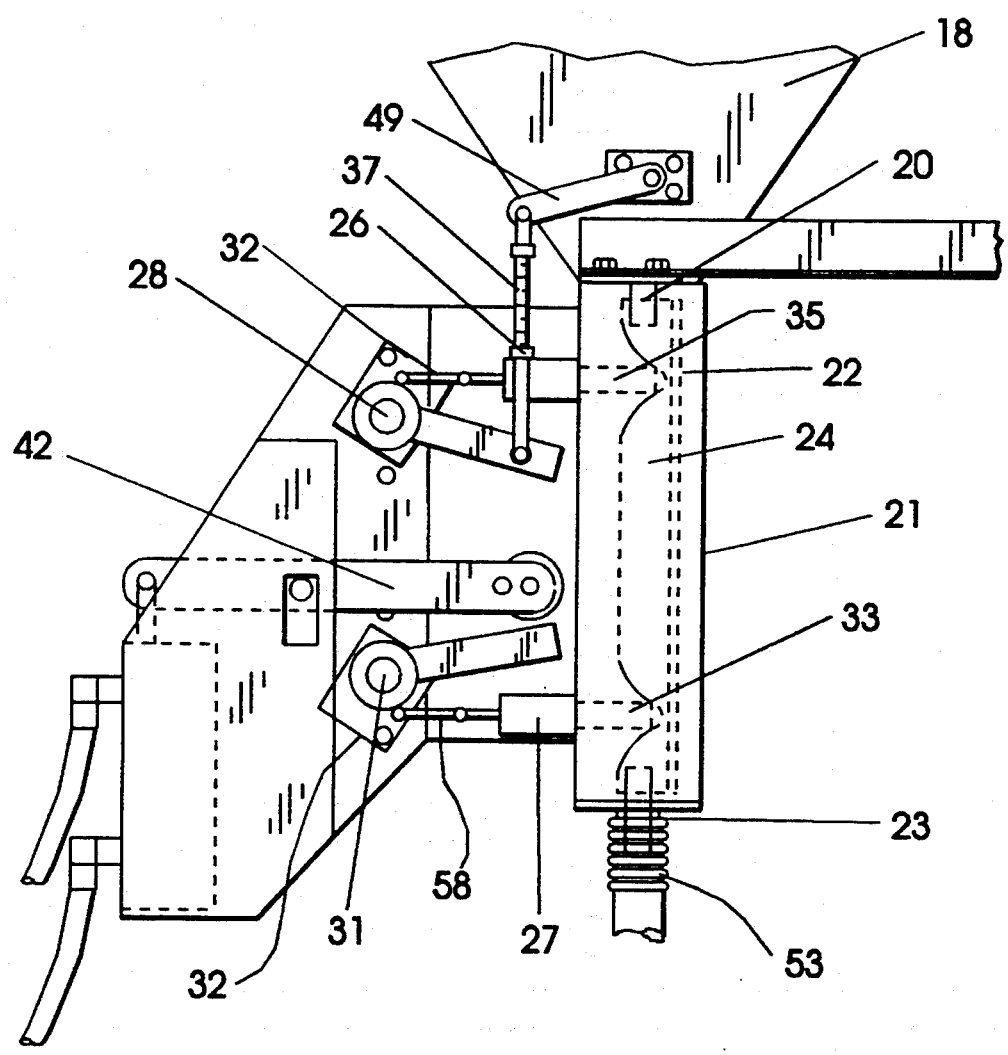
Figure 9:
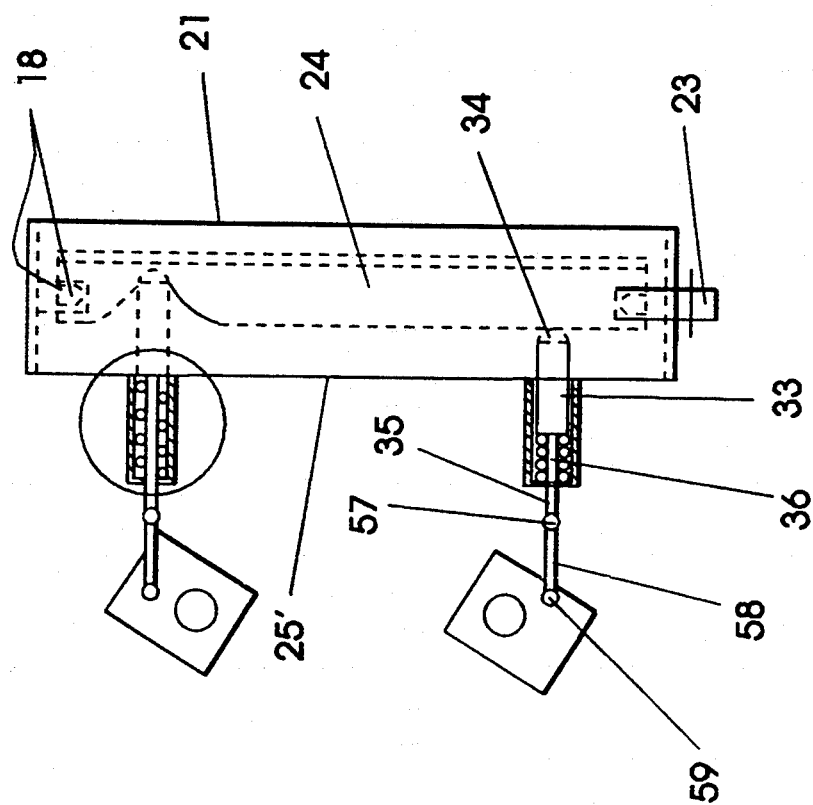
FIG. 9 is a cutaway view showing details of the plungers.
Figure 8B:
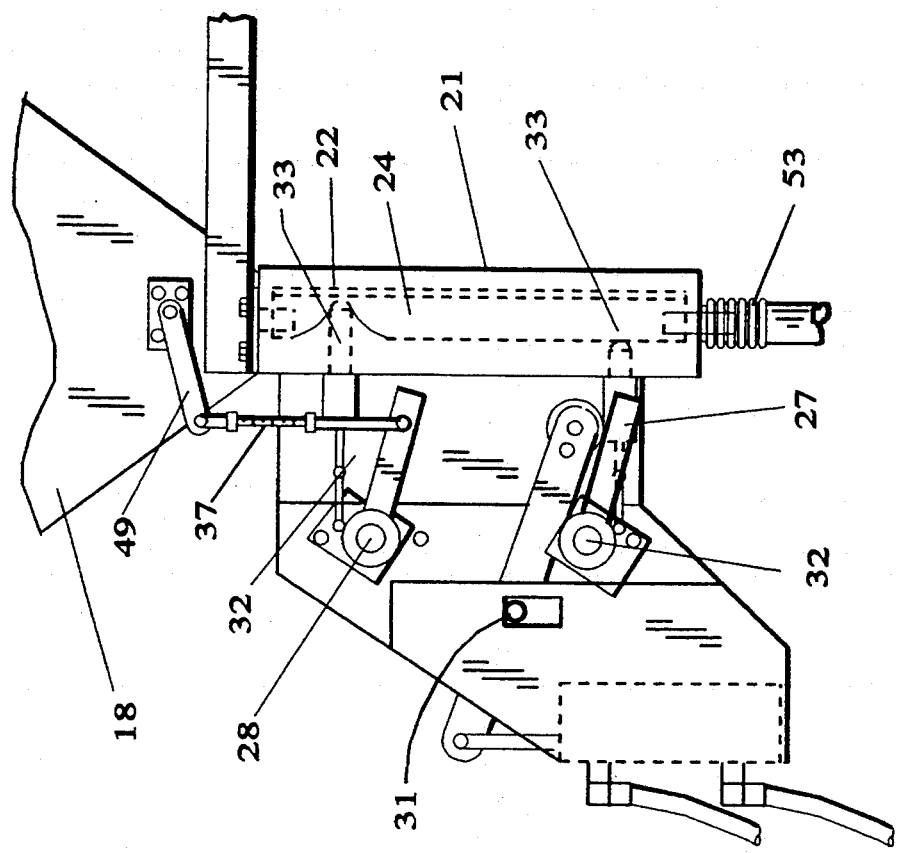

The hydraulic activator 46 is again manipulated to extend the piston rod 41' moves upwardly and when it is approximately half way through its stroke, it is disengaged from both plunger control levers 37 and 38 allowing both upper and lower plungers to crimp off tube 24 as shown in FIG. 7b. As the hydraulic piston rod 41' continues to extend outwardly from cylinder 41 the lower plunger control lever 38 is depressed as shown in FIG. 8b which withdraws the lower plungers from contact with measuring tube 24 while the upper plungers remain in crimping contact therewith. The backfill medium in the disbursing tube can flow downwardly through the flexible hoses 53 and disbursing tubes 54 and out the ends of each of the disbursing tubes 56 disposed adjacent the freshly drilled aeration holes 60 to fill the same. The operator of the support vehicle 84 can observe the flow of the backfill medium through the clear or opaque flexible hoses 53 and can tell when the flow has ceased and the tubes 24 are empty. He then raises the presser skirt 90 from engagement with the ground and moves the vehicle the width of the drill frame 26 and again drops the presser skirt into contact with the ground. The hydraulic control 46 again manipulated to return the plunger control levers to the positions shown in FIG. 6b to again fill the measuring tubes 24. Once the drilling operation has again been accomplished then the control 46 is manipulated to return to the position shown in FIG. 8b to again fill the recently drilled holes with backfill medium. This process is continued until the entire area to be aerated has been aerated and all of the holes filled with backfill.

From the above it can be seen that the present invention provides a means and method for aerating soils such as golf greens and backfilling the same in an expeditious manner. The entire aerating and backfilling process is accomplished in repetitive steps with the operator being able to observe each to determine when such step has been accomplished so that the next step can be initiated.

The terms "left", "right", "side", "front", "rear" and so forth have been used herein merely for convenience to describe the present invention and its parts as oriented in the drawings. It is to be understood, however, that these terms are in no way limiting to the invention since such invention may also be disposed in different orientations when in use.

The present invention may, of course, be carried out in other specific ways than those herein set forth without departing from the spirit and essential characteristics of such invention. The present embodiments are, therefore, to be considered in all respects illustrative and not restrictive, and all changes coming within the meaning and equivalency range of the appended claims are intended to be embraced therein.

What is claimed is:

1. A means for simultaneously backfilling a plurality of aeration holes formed in soil to improve vegetation growth including a transport means having a means associated therewith for forming said plurality of holes comprising: a hopper type means mounted on said transport means for holding bulk granulate, flowable backfill medium; a plurality of flexible deformable metering tube means having a memory operatively connected to said holding means; tube means operatively connected to and passing from each of said metering tube means to a point adjacent each of said plurality of aeration holes; and control means in the form of pairs of upper and lower plungers disposed adjacent each of said deformable measuring tubes and biased to crimp off such tubes to prevent flow of granulate material; upper and lower control levers pivotally mounted at one end and operatively secured to respective pairs of upper and lower plungers; a pivoted rocker arm operatively mounted adjacent said upper and lower control lever to alternately withdraw the upper and lower plungers from the adjacent deformable metering tube; and means for controlling said rocker arm whereby granulant material from said hopper can fill each of the deformable metering tubes when the upper plunger is out of contact therewith and can dispense said granulate material when the upper plunger deforms the tube and the lower plunger is out of contact therewith.

2. The means of claim 1 wherein the upper lever is operatively connected to a flow control means in said hopper.

3. The means of claim 1 wherein each of the rocker arms are operatively connected to at least one hydraulic cylinder.

4. The means of claim 1 wherein the bulk granulate backfill medium is sand.

* * * * *